(12) United States Patent
Hu et al.

(10) Patent No.: US 10,184,680 B2
(45) Date of Patent: *Jan. 22, 2019

(54) METHOD FOR CONTROLLING AIR OUTPUT VOLUME

(71) Applicant: Zhongshan Broad-Ocean Motor Co., Ltd., Zhongshan (CN)

(72) Inventors: Ge Hu, Zhongshan (CN); Xiansheng Zhang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 375 days.

This patent is subject to a terminal disclaimer.

(21) Appl. No.: 14/970,582

(22) Filed: Dec. 16, 2015

(65) Prior Publication Data

US 2016/0097558 A1 Apr. 7, 2016

Related U.S. Application Data

(62) Division of application No. 13/746,299, filed on Jan. 21, 2013, now abandoned.

(30) Foreign Application Priority Data

Apr. 26, 2012 (CN) .......................... 2012 1 0127123

(51) Int. Cl.
*F24F 11/00* (2018.01)
*F04D 27/00* (2006.01)
(Continued)

(52) U.S. Cl.
CPC ...... *F24F 11/0079* (2013.01); *F04D 15/0066* (2013.01); *F04D 15/0094* (2013.01);
(Continued)

(58) Field of Classification Search
CPC ............... F24F 11/0079; F24F 11/0001; F04D 15/0066; F04D 15/0094; F04D 27/004
See application file for complete search history.

(56) References Cited

U.S. PATENT DOCUMENTS 4,806,833 A 2/1989 Young
5,847,526 A * 12/1998 Lasko ..................... H02P 25/04
318/471
(Continued)

FOREIGN PATENT DOCUMENTS

CN 101647193 A 2/2010
CN 201531444 U 7/2010

OTHER PUBLICATIONS

B. Dai et al., Fan control method by total air volume in VAV systems, Heating Ventilating & Air Conditioning, 1999, pp. 1-6, vol. 29, issue 3, China Academic Journal Electronic Publishing House, China.
(Continued)

*Primary Examiner* — Changhyun Yi
(74) *Attorney, Agent, or Firm* — Matthias Scholl P.C.; Matthias Scholl

(57) ABSTRACT

A method for controlling air volume including: inputting a target air volume into the microprocessor control unit of the motor controller; starting a motor by the motor controller under a torque to enable the motor to work in a steady state; recording the rotational speed in the steady state, and establishing a functional relation formula Q=F (T, n, V) to calculate an air volume in the steady state; comparing the target air volume with the calculated air volume; re-recording a steady rotational speed after the motor falls on a new steady state under an increased or reduced torque, and recalculating the air volume in the new steady state; and
(Continued)

repeatedly adjusting the torque until the calculated air volume is equal or equivalent to the target air volume.

20 Claims, 5 Drawing Sheets

(51) Int. Cl.
    *G05B 19/416*     (2006.01)
    *F04D 15/00*     (2006.01)
    *F24F 11/77*     (2018.01)
    *F24F 11/75*     (2018.01)

(52) U.S. Cl.
    CPC ......... *F04D 27/004* (2013.01); *F04D 27/007* (2013.01); *F24F 11/0001* (2013.01); *F24F 11/75* (2018.01); *F24F 11/77* (2018.01); *G05B 19/416* (2013.01); *G05B 2219/37371* (2013.01); *Y02B 30/746* (2013.01)

(56) References Cited

U.S. PATENT DOCUMENTS

| | | | | |
|---|---|---|---|---|
| 6,356,044 | B1* | 3/2002 | Archer | H02K 11/33 318/538 |
| 7,573,217 | B2* | 8/2009 | Solan, Jr. | H02P 6/06 318/400.07 |
| 7,671,555 | B2* | 3/2010 | Mullin | F04D 27/004 236/51 |
| 9,182,141 | B2* | 11/2015 | Sullivan | F24F 1/0007 |
| 9,803,881 | B2* | 10/2017 | Hu | F24F 11/0001 |
| 2005/0119794 | A1* | 6/2005 | Amundson | G05D 23/1902 700/276 |
| 2005/0257540 | A1* | 11/2005 | Choi | F24F 3/166 62/180 |
| 2007/0084939 | A1* | 4/2007 | Liu | B64D 13/00 236/91 D |
| 2010/0298993 | A1 | 11/2010 | Eaton et al. | |
| 2017/0159960 | A1* | 6/2017 | Hopkins | F24F 11/0079 |

OTHER PUBLICATIONS

H. Zhu, The controlling method of the air volume of fan in VAV system and its realization, Journal of Huangshi Institute of Technology, Dec. 2007, pp. 12-16, vol. 23, No. 6, Huangshi Institute of Technology, China.

* cited by examiner

METHOD FOR CONTROLLING AIR OUTPUT VOLUME

CROSS-REFERENCE TO RELATED APPLICATIONS

This application is a divisional of U.S. Ser. No. 13/746,299 filed on Jan. 21, 2013 now pending, which claims the benefit of Chinese Patent Application No. 201210127123.2 filed Apr. 26, 2012, the contents of which, including any intervening amendments thereto, are incorporated herein by reference.

BACKGROUND OF THE INVENTION

Field of the Invention

The invention relates to a method for controlling air volume provided by a motor and by an air-conditioning fan system.

Description of the Related Art

In an indoor ventilation duct of a household air-conditioner, static pressure often changes because of dust deposition in a duct or blockage of a filter. The static pressure is often higher than the standard static pressure for a nominal system in a manufacturer laboratory. Constant air volume control can provide constant air volume for users under such cases, so as to maintain the comfortable ventilating, cooling or heating effect under broad static pressure conditions.

To realize constant air volume, an air volume meter can be installed. However, this increases the cost and the risk of failure. In addition, rotational speed can be adjusted by monitoring the changes of static pressure. A typical method for determination of the air volume is to directly measure the external static pressure, which requires that the relationship between the static pressure and air volume is measured in advance, then the torque of a motor is calculated under the static pressure corresponding to the specified air volume, and speed adjustment is carried out by monitoring the changes of static pressure. This, however, requires a powerful microprocessor control unit (MCU), which further increases the cost.

SUMMARY OF THE INVENTION

In view of the above-described problems, it is one objective of the invention to provide a method for controlling air volume provided by a motor. The method features high efficiency, high speed, high control accuracy, simple and convenient mathematical model for air volume calculation, and low implementation cost, and can automatically adapt a wide range of static pressures.

To achieve the above objective, in accordance with one embodiment of the invention, there is provided a method for controlling air volume provided by a motor, the method comprising:

1) testing a relationship between air volume and rotational speed of a motor system under different constant torques, and establishing a functional relation formula $Q=F(T, n, V)$ for calculating the air volume, Q representing the air volume, T representing a torque, n representing the rotational speed, V representing an adjustment coefficient, and each torque section having a corresponding adjustment coefficient which is input to a microprocessor control unit of a motor controller;
2) inputting a target air volume $Q_{ref}$ into the microprocessor control unit of the motor controller;
3) starting the motor by the motor controller and allowing the motor to work in a steady state under a torque T;
4) recording the rotational speed in the steady state, acquiring the adjustment coefficient V under the torque T through a table look-up method, and calculating an air volume $Q_c$ in the steady state according to the functional relation formula in step 1);
5) comparing the target air volume $Q_{ref}$ with the calculated air volume $Q_c$ by the microprocessor control unit of the motor controller, and a) maintaining the rotational speed and allowing the motor to work at the steady state and recording the rotational speed n when the target air volume $Q_{ref}$ is equal or equivalent to the calculated air volume $Q_c$; or b) increasing the torque T through the motor controller when the target air volume $Q_{ref}$ is greater than the calculated air volume $Q_c$, or c) decreasing the torque T through the microprocessor control unit of the motor controller when the target air volume $Q_{ref}$ is smaller than the calculated air volume $Q_c$;
6) re-recording a steady rotational speed after the motor falls on a new steady state under an increased or reduced torque, re-searching the corresponding adjustment coefficient V through the table look-up method, and recalculating the air volume $Q_c$ in the new steady state; and
7) repeating step 5) and step 6) to adjust the torque until the calculated air volume $Q_c$ is equal or equivalent to the target air volume $Q_{ref}$, and recording the rotational speed n in the steady state after the motor falls on the steady state.

In a class of this embodiment, step 7) is followed by step 8), that is, when the rotational speed and the air output volume change due to the alteration of an external system, the motor controller compares the new steady rotational speed with the rotational speed in step 5) or step 7) to acquire the change of air output volume, and then steps 4), 5), 6), and 7) are repeated.

In accordance with another embodiment of the invention, there provided is a method for controlling air volume provided by an air-conditioning fan system, the air-conditioning fan system comprising a wind wheel and a motor, the motor comprising a motor controller, a stator component, and a rotor component, and the method comprising the following steps:

1) allowing the motor to work at a constant torque state, selecting a plurality of torque values comprising a base torque within a range without exceeding a rated torque, allowing the motor to work under different torques, and changing the external static pressure of the system in sequence to collect raw data comprising rotational speed and air volume parameters;
2) establishing a functional relation formula $Q=F(T, n, V)$ for calculating the air volume, Q representing the air volume, T representing a torque, n representing the rotational speed, V representing an adjustment coefficient, and each torque section having a corresponding adjustment coefficient which is input to a microprocessor control unit of a motor controller;
3) inputting a target air volume $Q_{ref}$ into the microprocessor control unit of the motor controller;
4) starting the motor by the motor controller under the torque T to enable the motor to work in a steady state;
5) recording the rotational speed in the steady state, acquiring the adjustment coefficient V under the torque T through a table look-up method, and calculating an air volume $Q_c$ in the steady state according to the functional relation formula in step 1);

6) comparing the target air volume $Q_{ref}$ with the calculated air volume $Q_c$ by the microprocessor control unit of the motor controller, and a) maintaining the rotational speed and allowing the motor to work at the steady state and recording the rotational speed n when the target air volume $Q_{ref}$ is equal or equivalent to the calculated air volume $Q_c$; or b) increasing the torque T through the motor controller when the target air volume $Q_{ref}$ is greater than the calculated air volume $Q_c$, or c) decreasing the torque T through the microprocessor control unit of the motor controller when the target air volume $Q_{ref}$ is smaller than the calculated air volume $Q_c$;

7) re-recording a steady rotational speed after the motor falls on a new steady state under an increased or reduced torque, re-searching the corresponding adjustment coefficient V by the motor controller through the table look-up method, and recalculating the air volume $Q_c$ in the new steady state; and 8) repeating step 6) and step 7) to adjust the torque until the calculated air volume $Q_c$ is equal or equivalent to the target air volume $Q_{ref}$, and recording the rotational speed n in the steady state after the motor falls on the steady state.

In a class of this embodiment, step 8) is followed by a step 9), that is, when the rotational speed and the air output volume change due to the alteration of an external system, the motor controller compares the new steady rotational speed with the rotational speed in step 6) or step 8) to acquire the change of air output volume, and then steps 5), 6), 7), and 8) are repeated.

In a class of this embodiment, the functional relation formula Q=F (T, n, V) is acquired as follows according to raw data of rotational speed and air volume parameters under a base torque $T_{base}$ and other torques and under different external static pressures: arranging the motor fixed on a wind wheel in an air-conditioning device, allowing the motor to work at the working state of constant torque, selecting a plurality of torque values comprising the base torque within the range without exceeding a rated torque, allowing the motor to work under different torques, and changing the external static pressure of the system in sequence to collect the raw data comprising the rotational speed and the air volume parameters.

In a class of this embodiment, a calculation formula for calculating air volume is as follows:

$$Q = c0 \times \sqrt{\frac{T \times V}{T_{base}}} + c1 \times n,$$

or $$Q = c0 \times \sqrt{\frac{T \times V}{T_{base}}} + c1 \times n + c2 \times n^2 \times \sqrt{\frac{T_{base}}{T \times V}},$$

in which coefficients c0, c1, and c2 are obtained by a curve fitting method under different external static pressures conditions of base torque $T_{base}$ according to the raw data of the rotational speed and air volume parameters.

In a class of this embodiment, the base torque $T_{base}$ ranges from 30% $T_0$ to 80% $T_0$, and $T_0$ represents a rated torque of the motor.

In a class of this embodiment, the value of the adjustment coefficient V in the functional relation formula Q=F (T, n, V) ranges from 0.1 to 2.

In a class of this embodiment, that the calculated air volume $Q_c$ is equal or equivalent to the target air volume $Q_{ref}$ in step 6) and step 8) means that the calculated air volume $Q_c$ is in the range of "target air volume $Q_{ref}$±error window", and the error window of the target air volume $Q_{ref}$ ranges from 1% to 2%.

In a class of this embodiment, the increasing or decreasing the torque T through the motor controller in step 6) means increasing or decreasing the torque T according to step length sequence of at least 1% $T_0$ each time, or new torque=current torque×(target air volume $Q_{ref}$/current calculated air volume $Q_c)^2$.

Advantages of the invention are summarized below:

1) The motor works at states of constant torque, and a plurality of torque values comprising the base torque are selected without exceeding the rated torque, so that the motor works under different torques. The external static pressure of the system is changed in sequence for collecting the raw data comprising rotational speed and air volume parameters, and the function relation formula Q=F (T, n, V) for calculating air volume is obtained according to the raw data comprising the rotational speed and the air volume parameters under different external static pressures conditions of different torques. The mathematical model for calculating air volume only has a first-order or second-order function, thus the method has high efficiency, high speed, high control accuracy, simple and convenient mathematical model for air volume calculation, and low implementation cost; through a lot of experiments and tests, the error of air volume is controlled in the range of 0.5%-5%, thus the method has a good application prospect; and 2) The method is practicable at a wide range of static pressures, and the air volume is calculated through measuring the external static pressure of the system, so that the structure of the product is simplified, and the cost is reduced.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, experiments detailing a method for controlling air volume to remain constant are described below. It should be noted that the following examples are intended to describe and not to limit the invention.

Figure 1:
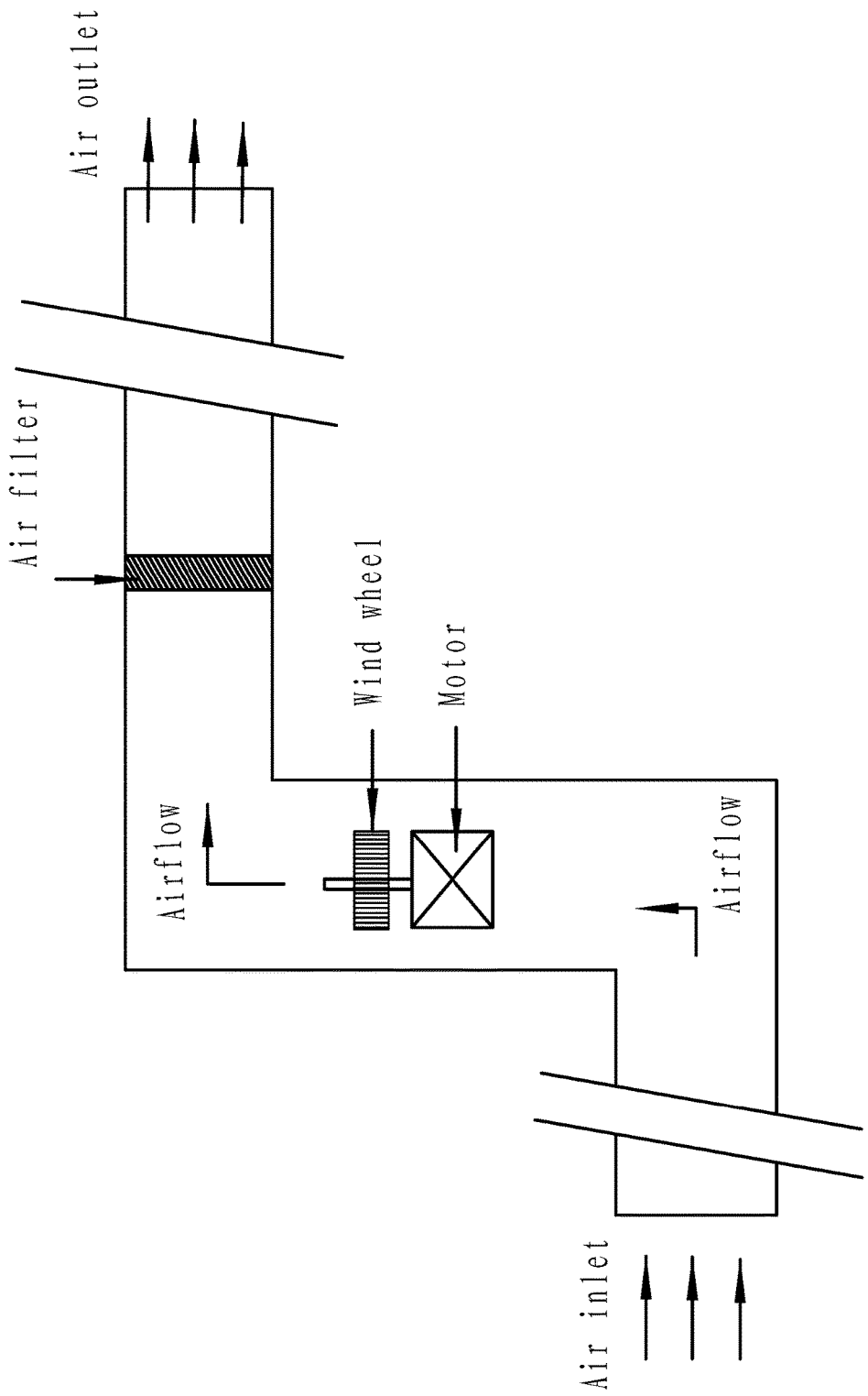
FIG. 1 is a structure diagram of a traditional air-conditioning fan system.

As shown in FIG. 1, a blower system (e.g., a gas furnace or an air processor, which are replaced with "motor+wind wheel" in the figure) is installed in a typical air-conditioning ventilation duct. An air filter is arranged in the duct. Air-blasting is started when the motor is started. The number of air outlets and air inlets is related to that of rooms, and there is no unified standard to design ducts. Meanwhile, the filter may have different pressure drops, and the blower system carrying a traditional single-phase AC motor (PSC motor) is positioned in a different duct, thus the actual air volume will be different.

Figure 2:
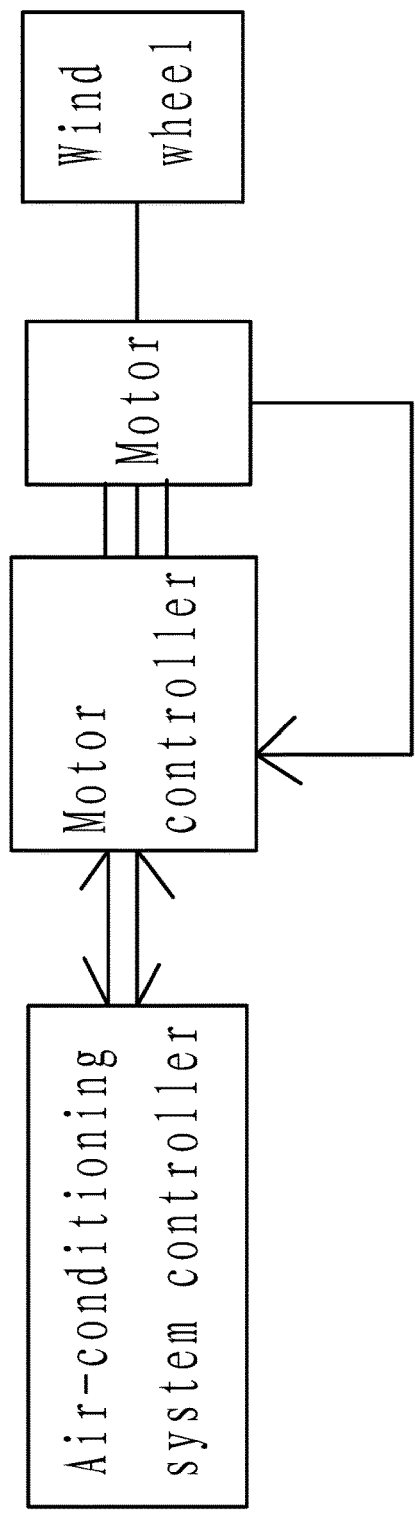
FIG. 2 is a control flowchart of an air conditioning system of in accordance with one embodiment of the invention.

As shown in FIG. 2, an electronically commutated motor (ECM) is employed to drive the wind wheel to rotate, and comprises a motor controller. The motor controller is connected to and communicates with an air-conditioning system controller, for example, the air-conditioning system controller sends the target air volume to the motor controller, and the motor controller controls the motor to drive the wind wheel to rotate, so as to output the target air volume, equivalently to the control of air volume.

Figure 3:
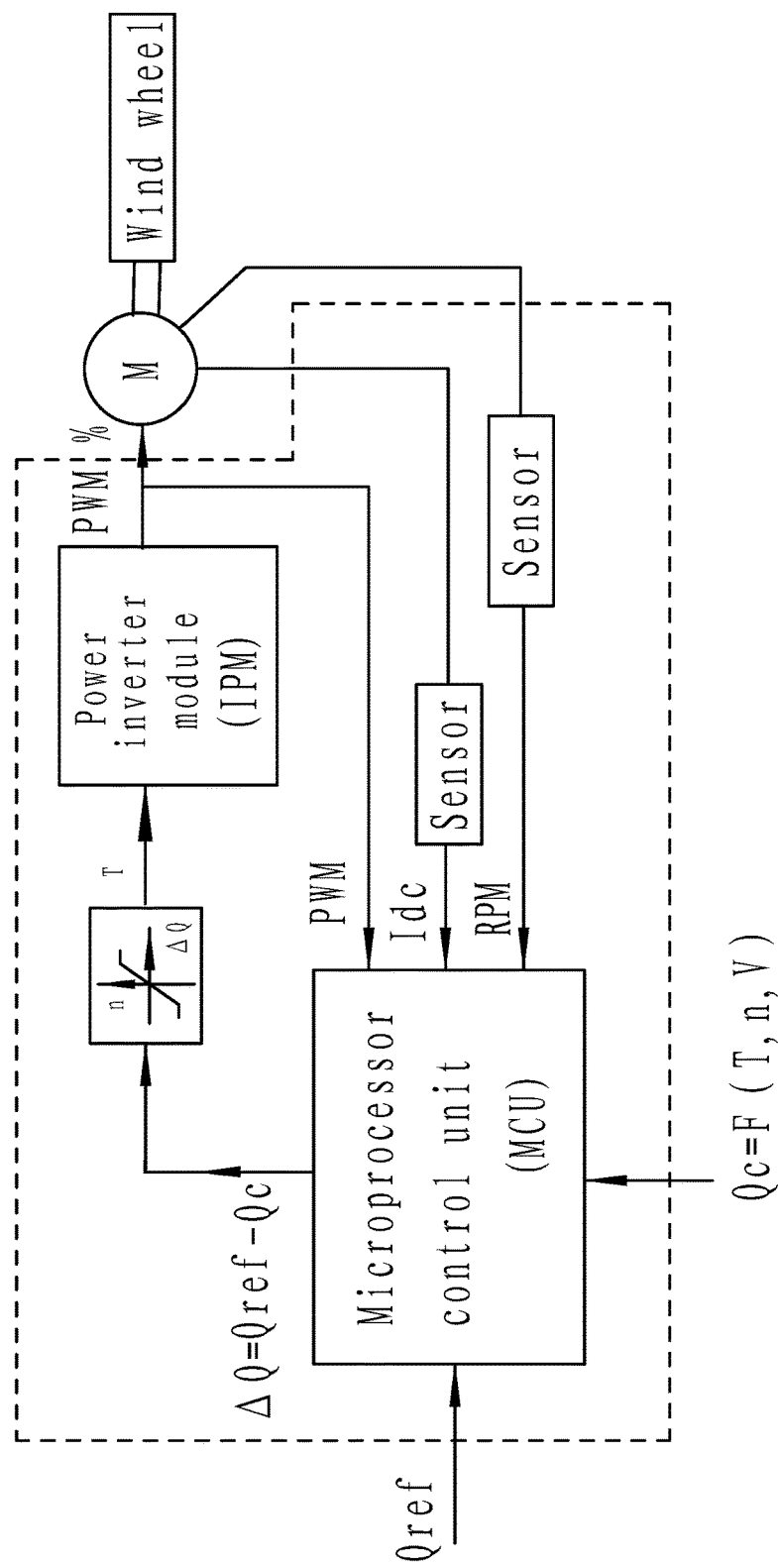
FIG. 3 is a functional block diagram of a method for controlling air volume in accordance with one embodiment of the invention.

As shown in FIG. 3, the air-conditioning system controller inputs a target air volume $Q_{ref}$ to a microprocessor control unit of the motor controller. The motor controller comprises a sensor, a microprocessor control unit, and a power inverter module. The sensor inputs a rotational speed signal RPM and a current signal $I_{dc}$ of the motor to the microprocessor control unit. A PWM (Pulse-Width Modulation) signal output by the power inverter module is also sent to the microprocessor control unit for processing. Every coefficient involved in a functional relation formula $Q=F (T, n, V)$, and a comparison table for corresponding adjustment coefficients V under different working torques, is input to the microprocessor control unit of the motor controller in advance. The microprocessor control unit compares the target air volume $Q_{ref}$ with the calculated air volume $Q_c$ (i.e., determines whether $\Delta Q=Q_{ref}-Q_c$ is equal to, larger than, or smaller than zero) for adjusting the output signals, and the torque is used as controlled amount for indirectly controlling air volume. When the target air volume $Q_{ref}$ is greater than the calculated air volume $Q_c$, the output torque T is increased through the motor controller; when the target air volume $Q_{ref}$ is smaller than the calculated air volume $Q_c$, the output torque T is reduced through the microprocessor control unit of the motor controller. After the motor enters a steady state, the steady rotational speed n under the increased or reduced torque is re-recorded. The motor controller is used for re-searching the corresponding adjustment coefficients V through a table look-up method. The calculated air volume $Q_c$ is recalculated, and the torque adjustment is stopped until the calculated air volume $Q_c$ is equal or equivalent to the target air volume $Q_{ref}$, and then the motor enters a steady state, i.e., the constant air volume state. The target air volume $Q_{ref}$ is a fixed value, however, in the microprocessor control unit, when the calculated air volume $Q_c$ is adjusted to the range of "target air volume $Q_{ref}$±error window", it is regarded that the requirement is met, and adjustment is stopped. The advantage is that the repeated adjustment due to small perturbations is avoided and the stable air volume is achieved. The error window of the target air volume $Q_{ref}$ generally ranges from 1% to 2%.

Technical scheme of a method for controlling air volume provided by an air-conditioning fan system of the invention is summarized as follows.

Also provided is a method for controlling air volume provided by an air-conditioning fan system, the air-conditioning fan system comprising a wind wheel and a motor, the motor comprising a motor controller, a stator component, and a rotor component, and the method comprising the following steps:

1) allowing the motor to work in a constant torque state, selecting a plurality of torque values comprising a base torque within a range without exceeding a rated torque, allowing the motor to work under different torques, and changing the external static pressure of the system in sequence to collect raw data comprising rotational speed and air volume parameters;
2) establishing a functional relation formula $Q=F (T, n, V)$ for calculating the air volume, Q representing the air volume, T representing a torque, n representing the rotational speed, V representing an adjustment coefficient, and each torque section having a corresponding adjustment coefficient which is input to a microprocessor control unit of a motor controller;
3) inputting a target air volume $Q_{ref}$ into the microprocessor control unit of the motor controller;
4) starting the motor by the motor controller and allowing the motor to work in a steady state under a torque T;
5) recording the rotational speed in the steady state, acquiring the adjustment coefficient V under the torque T through a table look-up method, and calculating an air volume $Q_c$ in the steady state according to the functional relation formula in step 1);
6) comparing the target air volume $Q_{ref}$ with the calculated air volume $Q_c$ by the microprocessor control unit of the motor controller, and a) maintaining the rotational speed and allowing the motor to work at the steady state and recording the rotational speed n when the target air volume $Q_{ref}$ is equal or equivalent to the calculated air volume $Q_c$; or b) increasing the torque T through the motor controller when the target air volume $Q_{ref}$ is greater than the calculated air volume $Q_c$, or c) decreasing the torque T through the microprocessor control unit of the motor controller when the target air volume $Q_{ref}$ is smaller than the calculated air volume $Q_c$;
7) re-recording a steady rotational speed after the motor falls on a new steady state under an increased or reduced torque, re-searching the corresponding adjustment coefficient V through the table look-up method, and recalculating the air volume $Q_c$ in the new steady state; and
8) repeating step 6) and step 7) to adjust the torque until the calculated air volume $Q_c$ is equal or equivalent to the target air volume $Q_{ref}$, and recording the rotational speed n in the steady state after the motor falls on the steady state.

Step 8) is followed by a step 9), that is, when the rotational speed and the air output volume change due to the alteration of an external system, the motor controller compares the new steady rotational speed with the rotational speed in step 6) or step 8) to acquire the change of air output volume, and then steps 5), 6), 7), and 8) are repeated.

The calculation formula for calculating air volume is as follows:

$$Q = c0 \times \sqrt{\frac{T \times V}{T_{base}}} + c1 \times n,$$

or

-continued $$Q = c0 \times \sqrt{\frac{T \times V}{T_{base}}} + c1 \times n + c2 \times n^2 \times \sqrt{\frac{T_{base}}{T \times V}},$$

in which coefficients c0, c1, and c2 are obtained by a curve fitting method under different external static pressures conditions of base torque $T_{base}$ according to the raw data of the rotational speed and air volume parameters.

The base torque $T_{base}$ ranges from 30% $T_0$ to 80% $T_0$, and $T_0$ represents a rated torque of the motor.

The value of the adjustment coefficient V in the functional relation formula Q=F (T, n, V) ranges from 0.1 to 2.

That the calculated air volume $Q_c$ is equal or equivalent to the target air volume $Q_{ref}$ in step 6) and step 8) means that the calculated air volume $Q_c$ is in the range of "target air volume $Q_{ref}$±error window", and the error window of the target air volume $Q_{ref}$ ranges from 1% to 2%.

The increasing or decreasing the torque T through the motor controller in step 6) means increasing or decreasing the torque T according to step length sequence of at least 1% $T_0$ each time, or new torque=current torque×(target air volume $Q_{ref}$/current calculated air volume $Q_c$)$^2$.

Following is the derivation process of the functional relation formula Q=F (T, n, V.

The law for the fan states that, under certain conditions, the air volume is proportional to the rotational speed, that is, $$\frac{Q_1}{Q_2} = \frac{n_1}{n_2};$$

the external air pressure of the fan is proportional to the square of the rotational speed, that is, $$\frac{P_1}{P_2} = \left(\frac{n_1}{n_2}\right)^2;$$

and
the output torque of the motor, i.e., the input torque of the fan, is proportional to the square of the rotational speed, that is, $$\frac{T_1}{T_2} = \left(\frac{n_1}{n_2}\right)^2 = \left(\frac{Q_1}{Q_2}\right)^2;$$

n represents the rotational speed of the motor, Q represents air volume, P represents the external air pressure rise of the fan, and T represents the output torque of the motor, i.e., the input torque of the fan.

For convenient derivation, the relation formula between the air volume and rotational speed is as follows:

$$Q_{equiv} = c0 + c1 \times n_{equiv},$$

or (if the quadratic polynomial is used)

$$Q_{equiv} = c0 + c1 \times n_{equiv} + c2 \times n_{equiv}^2.$$

From the formula above, by combining the law for the fan, the relationship between the rotational speed and air volume can be further derived under an arbitrary torque. To do this, it is needed to derive how the equivalent air volume $Q_{equiv}$ and equivalent rotational speed $n_{equiv}$ are converted into a new torque under the torque (T=$T_{base}$) according to the law for the fan:

$$Q_{equiv} = Q \times \sqrt{\frac{T_{base}}{T}}$$

$$n_{equiv} = n \times \sqrt{\frac{T_{base}}{T}}.$$

If the linear relation formula is used, then $$Q(T, n) = Q_{equiv} \times \sqrt{\frac{T}{T_{base}}}$$

$$= \left(c0 + c1 \times n \times \sqrt{\frac{T_{base}}{T}}\right) \times \sqrt{\frac{T}{T_{base}}}$$

$$= c0 \times \sqrt{\frac{T}{T_{base}}} + c1 \times n.$$

If the quadratic polynomial is used, then $$Q(T, n) = Q_{equiv} \times \sqrt{\frac{T}{T_{base}}}$$

$$= \left(c0 + c1 \times n \times \sqrt{\frac{T_{base}}{T}} + c2 \times n^2 \times \frac{T_{base}}{T}\right) \times \sqrt{\frac{T}{T_{base}}}$$

$$= c0 \times \sqrt{\frac{T}{T_{base}}} + c1 \times n + c2 \times n^2 \times \sqrt{\frac{T_{base}}{T}}.$$

From the experimental results, the device for testing air volume is always used for dynamically regulating back pressure for controlling the external static pressure, it causes that the law for the fan is invalid in the whole range of air volume, thus an adjustment coefficient V is required to be added in the formula above. The formula after adjustment is as follows.

If the linear relation formula is used, then $$Q = c0 \times \sqrt{\frac{T \times V}{T_{base}}} + c1 \times n;$$

If the quadratic polynomial is used, then $$Q = c0 \times \sqrt{\frac{T \times V}{T_{base}}} + c1 \times n + c2 \times n^2 \times \sqrt{\frac{T_{base}}{T \times V}}.$$

The value of the adjustment coefficient V is changed between 0.1 and 2, and the selecting principle is that the air volume value calculated from the formula above is equal or similar to the actual test value. Table 1 is a value table for the adjustment coefficient V of a load.

TABLE 1

Value table for the adjustment coefficient V of a load

| | $T_0$% | | | | | | | | | |
|---|---|---|---|---|---|---|---|---|---|---|
| | 10 | 20 | 30 | 40 | 50 | 60 | 70 | 80 | 90 | 100 |
| V | 1.68 | 1.25 | 1.09 | 1.05 | 1 | 0.98 | 0.94 | 0.92 | 0.89 | 0.87 |

The base torque $T_{base}$ in Table 1 is set to be 50% $T_0$, and for convenient testing, other torques are selected to be 10% $T_0$, 20% $T_0$, 30% $T_0$, 40% $T_0$, 60% $T_0$, 70% $T_0$, 80% $T_0$, 90% $T_0$, and 100% $T_0$. The corresponding adjustment coefficient V values are also recorded in Table 1, $T_0$ represents the rated torque of the motor, and the V value can be calculated through linear interpolation of the V value of two adjacent Ts under other working conditions of unmeasured torque.

The calculation formula above is premised on selecting a base torque $T_{base}$ for deriving the functional relation formula between the air volume and rotational speed under the torque. Therefore, the calculating precision is ensured, and from the point of calculation amount simplification, the function can be linear, that is, $$Q_{equiv} = c0 + c1 \times n_{equiv},$$

or a quadratic polynomial, that is, $$Q_{equiv} = c0 + c1 \times n_{equiv} + c2 \times n_{equiv}^2.$$

The experimental data shows that the problem of "excessive curve fitting" will be raised when a higher-order function is used for describing the relationship between the air volume and rotational speed, i.e., the phenomenon that the calculation amount is increased, but the fitting precision is not enhanced. With this function, the calculating function formula Q=F (T, n, V) for the air volume can be further derived under any other torque and rotational speed. The value of the adjustment coefficient V is also different under different torques. Therefore, the working state of constant torque of the motor is required to be set, and the values of a plurality of torques T comprising the base torque are selected in the range of without exceeding the rated torque, so that the motor works under different torques T, and the external static pressure of the system is changed in sequence for collecting the raw data comprising rotational speed and air volume parameters. The test result of part of the raw data of a load is shown in Table 2 below.

TABLE 2

Part of the raw data of a load

| Torques T | Static pressure (Pa) | Actual test value of air volume Q (CFM) | Actual test value of rotational speed (RPM) |
|---|---|---|---|
| $T_0$* 100% | 25 | 1476.5 | 314 |
| $T_0$* 100% | 50 | 1441.1 | 935 |
| $T_0$* 100% | 75 | 1407.7 | 968 |
| $T_0$* 50% | 25 | 1072.3 | 713 |
| $T_0$* 50% | 50 | 1035.8 | 750 |
| $T_0$* 50% | 75 | 995.6 | 785 |
| $T_0$* 10% | 25 | 573.0 | 472 |
| $T_0$* 10% | 37.5 | 503.8 | 501 |
| $T_0$* 10% | 50 | 486.6 | 545 |

The corresponding adjustment coefficients V under different torques in Table 1 are obtained through the raw data, and the selecting principle is that the air volume value calculated from the formula above is equal or similar to the actual test value.

Figure 4:
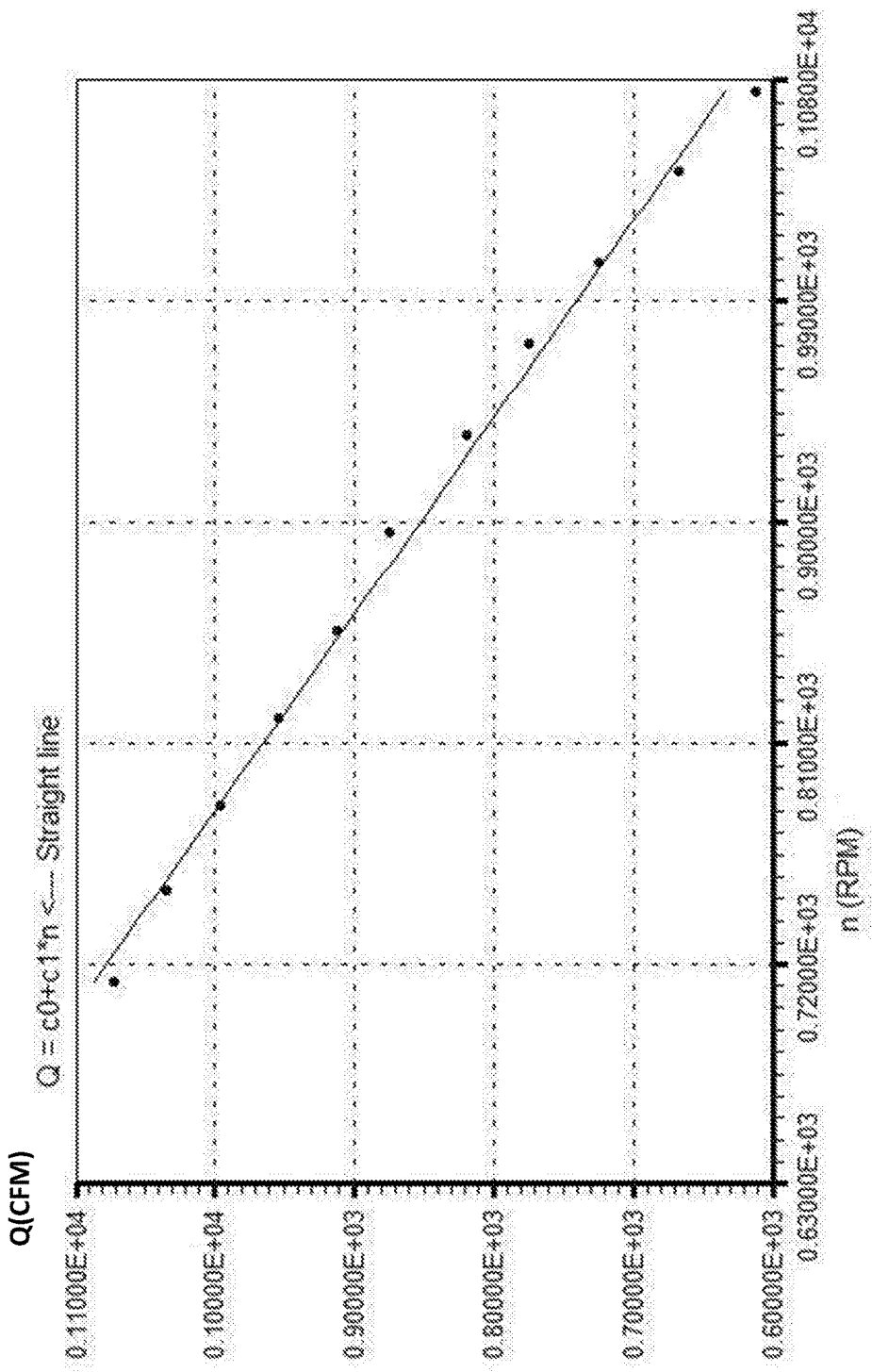
FIG. 4 is a straight line fitting diagram of measured data on a load.

The following example illustrates the control process to provide constant air volume.

step 1, after obtaining the raw data taking the table above as an example, selecting the base torque (T=50% $T_0$), carrying out drawing and straight-line fitting by using the data of rotational speed n and actually measured air volume $Q_c$, establishing the function relation formula $Q_{base}$=F (n) for calculating air volume under the base torque, and here taking the linear relation formula under the base torque as an example:

$$Q_{equiv} = c0 + c1 \times n_{equiv},$$

so as to be drawn into an image shown in FIG. 4; obtaining two air volume coefficients c0 and c1 by a curve fitting method; on the basis of original data, determining the V values under all the torques according to the V value selecting principle that "The calculated air volume value is equal or similar to the actually measured air volume value", as shown in Table 1. At the moment, the function relation formula Q=F (T, n, V) for calculating air volume under any rotational speed and torque can be determined as follows:

$$Q = c0 \times \sqrt{\frac{T \times V}{T_{base}}} + c1 \times n,$$

Figure 5:
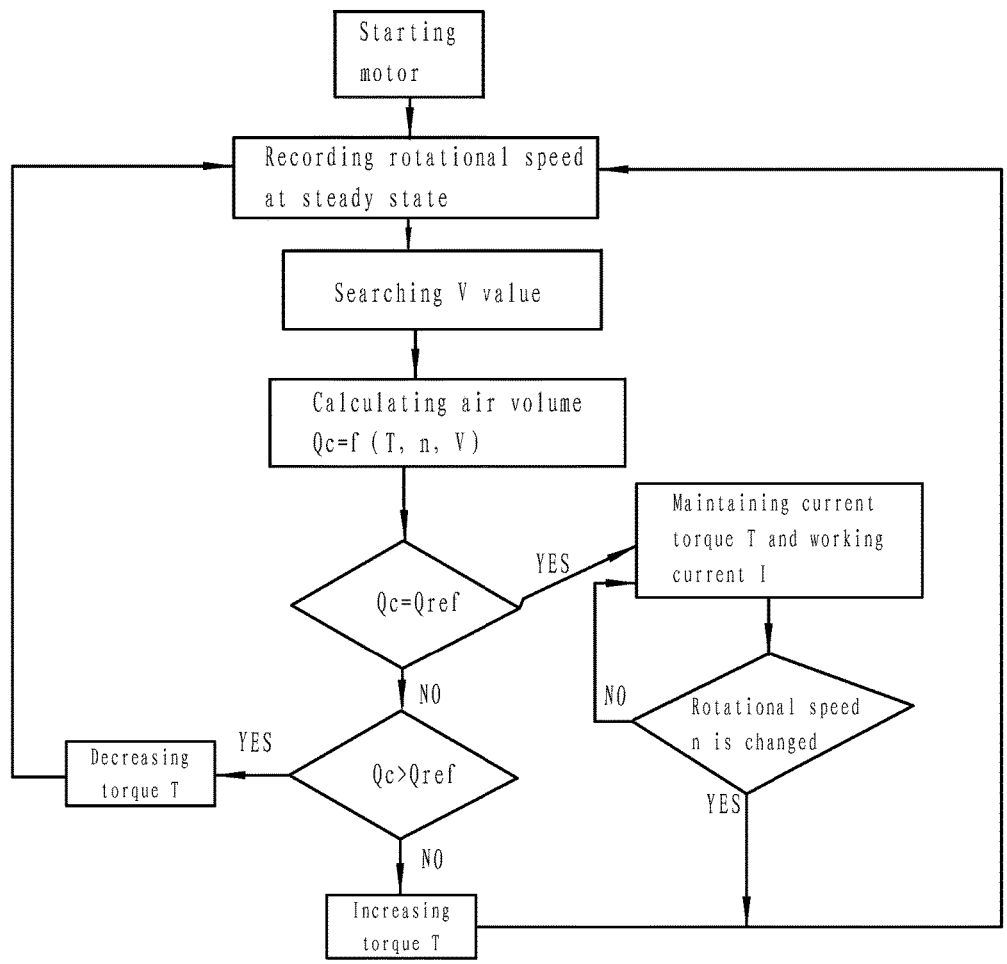
FIG. 5 is a part of flowchart of a method for controlling air volume in accordance with one embodiment of the invention.

Q represents air volume (CFM), T represents torque, n represents rotational speed (RPM),
V represents adjustment coefficient shown in Table 1, and the V values are input to the microprocessor control unit of the motor controller in advance.

step 2, inputting a target air volume $Q_{ref}$ into the microprocessor control unit of the motor controller.

steps 3-8 are shown in FIG. 5.

step 3, starting the motor by the motor controller under the torque T to enable the motor to work in a steady state;

step 4, recording the rotational speed in the steady state, acquiring the adjustment coefficient V under the torque T through a table look-up method, and calculating an air volume $Q_c$ in the steady state according to the functional relation formula in step 1);

step 5, comparing the target air volume $Q_{ref}$ with the calculated air volume $Q_c$ by the microprocessor control unit of the motor controller, and a) maintaining the rotational speed and allowing the motor to work at the steady state and recording the rotational speed n when the target air volume $Q_{ref}$ is equal or equivalent to the calculated air volume $Q_c$; or b) increasing the torque T through the motor controller when the target air volume $Q_{ref}$ is greater than the calculated air volume $Q_c$, or c) decreasing the torque T through the microprocessor control unit of the motor controller when the target air volume $Q_{ref}$ is smaller than the calculated air volume $Q_c$;

step 6, re-recording a steady rotational speed after the motor falls on a new steady state under an increased or reduced torque, re-searching the corresponding adjustment coefficient V through the table look-up method, and recalculating the air volume $Q_c$ in the new steady state; and step 7, repeating step 5) and step 6) to adjust the torque until the calculated air volume $Q_c$ is equal or equivalent to the target air volume $Q_{ref}$, and recording the rotational speed n in the steady state after the motor falls on the steady state.

Step 7 is followed by a step 8, that is, when the rotational speed and the air output volume change due to the alteration of an external system, the motor controller compares the new steady rotational speed with the rotational speed in step 5) or step 7) to acquire the change of air output volume, and then steps 4), 5), 6), and 7) are repeated.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling a motor, the method comprising:
   1) inputting a target air volume $Q_{ref}$ into a microprocessor control unit of a motor controller;
   2) starting the motor by the motor controller, and presetting a torque T;
      2a) allowing the motor to work in a steady state under the torque T;
   3) determining an air volume $Q_c$ generated by the motor by detecting and recording a rotational speed in the steady state: acquiring an adjustment coefficient V under the torque T through a table look-up method, and establishing a functional relation formula Q=F (T, n, V) to calculate the air volume $Q_c$ in the steady state, Q representing the air volume, T representing the torque, n representing the rotational speed, V representing the adjustment coefficient, and each torque section having a corresponding adjustment coefficient;
   4) adjusting the torque T after comparing the target air volume $Q_{ref}$ with the air volume $Q_c$ by the microprocessor control unit of the motor controller: a) increasing the torque T through the motor controller when the target air volume $Q_{ref}$ is greater than the air volume $Q_c$, or b) decreasing the torque T through the microprocessor control unit of the motor controller when the target air volume $Q_{ref}$ is smaller than the air volume $Q_c$; and
   5) repeating 2a), 3), and 4) until the air volume $Q_c$ is equal or equivalent to the target air volume $Q_{ref}$, maintaining the torque, allowing the motor to work at the steady state, and recording the rotational speed n in the steady state after the motor falls on the steady state.

2. The method of claim 1, wherein the functional relation formula Q=F (T, n, V) is as follows:

$$Q = c0 \times \sqrt{\frac{T \times V}{T_{base}}} + c1 \times n,$$

or $$Q = c0 \times \sqrt{\frac{T \times V}{T_{base}}} + c1 \times n + c2 \times n^2 \times \sqrt{\frac{T_{base}}{T \times V}},$$

in which coefficients c0, c1, and c2 are obtained by a curve fitting method under different external static pressures conditions of a base torque $T_{base}$ according to raw data of the rotational speed and air volume parameters.

3. The method of claim 2, wherein the base torque $T_{base}$ ranges from 30% $T_0$ to 80% $T_0$, and $T_0$ represents a rated torque of the motor.

4. The method of claim 2, wherein a value of the adjustment coefficient V in the functional relation formula Q=F (T, n, V) ranges from 0.1 to 2.

5. The method of claim 2, wherein that the calculated air volume $Q_c$ is equal or equivalent to the target air volume $Q_{ref}$ in 5) means that the calculated air volume $Q_c$ is in a range of "target air volume $Q_{ref}$±error window", and the error window of the target air volume $Q_{ref}$ ranges from 1% to 2%.

6. The method of claim 2, wherein increasing or decreasing the torque T through the motor controller in 4) means increasing or decreasing an instant torque T according to step length sequence of at least 1% $T_0$ each time, or new torque=current torque×(target air volume $Q_{ref}$/current calculated air volume $Q_c)^2$.

7. The method of claim 2, wherein the functional relation formula Q=F (T, n, V) is acquired as follows according to raw data of rotational speed and air volume parameters under a base torque $T_{base}$ and other torques and under different external static pressures:
   a) arranging the motor fixed on a wind wheel in an air-conditioning device;
   b) allowing the motor to work at a working state of constant torque;
   c) selecting a plurality of torque values comprising the base torque within the range without exceeding a rated torque;
   d) allowing the motor to work under different torques; and
   e) changing the external static pressure of the system in sequence to collect the raw data comprising the rotational speed and the air volume parameters.

8. The method of claim 1, wherein a value of the adjustment coefficient V in the functional relation formula Q=F (T, n, V) ranges from 0.1 to 2.

9. The method of claim 1, wherein that the air volume $Q_c$ is equal or equivalent to the target air volume $Q_{ref}$ in 5) means that the calculated air volume $Q_c$ is in a range of "target air volume $Q_{ref}$±error window", and the error window of the target air volume $Q_{ref}$ ranges from 1% to 2%.

10. The method of claim 1, wherein increasing or decreasing the torque T through the motor controller in 4) means increasing or decreasing an instant torque T according to step length sequence of at least 1% $T_0$ each time, or new torque=current torque×(target air volume $Q_{ref}$/current calculated air volume $Q_c)^2$.

11. The method of claim 1, wherein the functional relation formula Q=F (T, n, V) is acquired as follows according to raw data of rotational speed and air volume parameters under a base torque $T_{base}$ and other torques and under different external static pressures:
   a) arranging the motor fixed on a wind wheel in an air-conditioning device;
   b) allowing the motor to work at a working state of constant torque;
   c) selecting a plurality of torque values comprising the base torque within the range without exceeding a rated torque;
   d) allowing the motor to work under different torques; and
   e) changing the external static pressure of the system in sequence to collect the raw data comprising the rotational speed and the air volume parameters.

12. A method for controlling an air-conditioning fan system, the air-conditioning fan system comprising a wind wheel and a motor, the motor comprising a motor controller, a stator component, and a rotor component, the method comprising:
   1) inputting a target air volume $Q_{ref}$ into a microprocessor control unit of the motor controller;
   2) starting the motor by the motor controller, and presetting a torque T;
      2a) allowing the motor to work in a steady state under the torque T;

3) determining an air volume $Q_c$ generated by the air-conditioning fan system by detecting and recording a rotational speed in the steady state: acquiring an adjustment coefficient V under the torque T through a table look-up method, and calculating the air volume $Q_c$ in the steady state according to a functional relation formula Q=F (T, n, V), Q representing the air volume, T representing a torque, n representing the rotational speed, V representing an adjustment coefficient, and each torque section having a corresponding adjustment coefficient;

4) adjusting the torque T after comparing the target air volume $Q_{ref}$ with the air volume $Q_c$ by the microprocessor control unit of the motor controller: a) increasing the torque T through the motor controller when the target air volume $Q_{ref}$ is greater than the air volume $Q_c$, or b) decreasing the torque T through the microprocessor control unit of the motor controller when the target air volume $Q_{ref}$ is smaller than the air volume $Q_c$; and 5) repeating 2a), 3), and 4) until the air volume $Q_c$ is equal or equivalent to the target air volume $Q_{ref}$, and recording the rotational speed n in the steady state after the motor falls on the steady state.

13. The method of claim 12, wherein the functional relation formula Q=F (T, n, V) is as follows:

$$Q = c0 \times \sqrt{\frac{T \times V}{T_{base}}} + c1 \times n,$$

or $$Q = c0 \times \sqrt{\frac{T \times V}{T_{base}}} + c1 \times n + c2 \times n^2 \times \sqrt{\frac{T_{base}}{T \times V}},$$

in which coefficients c0, c1, and c2 are obtained by a curve fitting method under different external static pressures conditions of base torque $T_{base}$ according to the raw data of the rotational speed and air volume parameters.

14. The method of claim 13, wherein the base torque $T_{base}$ ranges from 30% $T_0$ to 80% $T_0$, and $T_0$ represents a rated torque of the motor.

15. The method of claim 13, wherein a value of the adjustment coefficient V in the functional relation formula Q=F (T, n, V) ranges from 0.1 to 2.

16. The method of claim 13, wherein that the calculated air volume $Q_c$ is equal or equivalent to the target air volume $Q_{ref}$ in 5) means that the calculated air volume $Q_c$ is in a range of "target air volume $Q_{ref}$±error window", and the error window of the target air volume $Q_{ref}$ ranges from 1% to 2%.

17. The method of claim 13, wherein increasing or decreasing the torque T through the motor controller in 4) means increasing or decreasing an instant torque T according to step length sequence of at least 1% $T_0$ each time, or new torque=current torque×(target air volume $Q_{ref}$/current calculated air volume $Q_c$)$^2$.

18. The method of claim 12, wherein a value of the adjustment coefficient V in the functional relation formula Q=F (T, n, V) ranges from 0.1 to 2.

19. The method of claim 12, wherein that the air volume $Q_c$ is equal or equivalent to the target air volume $Q_{ref}$ in 5) means that the calculated air volume $Q_c$ is in a range of "target air volume $Q_{ref}$±error window", and the error window of the target air volume $Q_{ref}$ ranges from 1% to 2%.

20. The method of claim 12, wherein increasing or decreasing the torque T through the motor controller in 4) means increasing or decreasing an instant torque T according to step length sequence of at least 1% $T_0$ each time, or new torque=current torque×(target air volume $Q_{ref}$/current calculated air volume $Q_c$)$^2$.

* * * * *